United States Patent
Van Dooren et al.

(10) Patent No.: US 8,575,485 B2
(45) Date of Patent: Nov. 5, 2013

(54) CURRENT CONDUCTOR

(75) Inventors: Didier Van Dooren, Grenoble (FR);
Jean-Marc Reppelin, La Ravoire (FR);
Philippe Gerbier, Saint Ismier (FR);
Pascal Lepretre, Les Marches (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 122 days.

(21) Appl. No.: 13/371,926

(22) Filed: Feb. 13, 2012

(65) Prior Publication Data
US 2012/0222881 A1      Sep. 6, 2012

(30) Foreign Application Priority Data

Mar. 1, 2011  (FR) ...................... 11 00617

(51) Int. Cl.
*H02G 5/10*      (2006.01)
(52) U.S. Cl.
USPC .......... 174/68.2; 174/135; 174/68.1; 336/198
(58) Field of Classification Search
USPC ........... 174/68.2, 135, 69, 68.1, 116; 336/198
See application file for complete search history.

(56) References Cited

U.S. PATENT DOCUMENTS

| | | | |
|---|---|---|---|
| 2,057,266 A | 10/1936 | Rippere | |
| 3,509,514 A | 4/1970 | Christensen et al. | |
| 5,665,940 A * | 9/1997 | Chimura et al. | 174/116 |
| 5,847,321 A | 12/1998 | Carle et al. | |
| 6,300,571 B1 * | 10/2001 | Scannell et al. | 174/68.1 |
| 6,870,104 B2 * | 3/2005 | Tsunoda et al. | 174/72 A |
| 7,696,433 B2 * | 4/2010 | Winkelbach et al. | 174/68.1 |
| 2010/0059276 A1 | 3/2010 | Bhathija et al. | |

FOREIGN PATENT DOCUMENTS

| | | |
|---|---|---|
| EP | 0 681 355 A1 | 11/1995 |
| GB | 1 484 192 | 9/1977 |
| WO | WO 00/27007 | 5/2000 |

* cited by examiner

*Primary Examiner* — Dhirubhai R Patel
(74) *Attorney, Agent, or Firm* — Steptoe & Johnson LLP

(57) ABSTRACT

A longitudinal, generally parallelepiped electrical conductor bar, having a generally rectangular cross-sectional area having two sides and two ends, a substantially arc-like portion extending from one corner to an adjacent corner of that area, the arc-like portion defining two complementary sections, a first whose perimeter includes the arc-like portion, the two ends and one of the two sides, and a second whose perimeter includes the arc-like section and the other side, with parallel, elongate bores extending through the length of the conductor bar.

20 Claims, 4 Drawing Sheets

CURRENT CONDUCTOR

BACKGROUND OF THE INVENTION

The present invention relates to a current conductor of bar type, a set of different current conductors and an arrangement of current conductors. It also relates to a cabinet for housing an electric power supply and/or distribution installation comprising at least one such current conductor.

STATE OF THE ART

When the current is high, the most widespread solution for current conduction consists in using flat copper bars having a cross-section that is determined according to the rated current. These bars can be very heavy and difficult to handle. An optimization consists in hollowing out the centre of the bar or of the juxtaposition of bars to form a bar of tubular type or a folded copper section.

Supports are further fitted to the cross-sections of the bars to secure them in place at the back of the cabinets. The document EP0681355 thus describes a device enabling several current conductors in the form of bars or elongate sections to be accommodated, enabling precise positioning of the latter in a vertical direction. This device is suitable for different conductor cross-sections representing a range of current ratings suitable for low-voltage current conduction up to 1600 A. This solution presents the advantage of facilitating electric connections with the line-side or load-side devices.

In particular for high ratings, it appears that the quantity of copper necessary for these configurations is large, resulting in a substantial weight of the current conductors and above all a high cost. It has of course been envisaged to replace copper by aluminium, but the electrical engineering limits of this solution do not however enable such wide ranges of busbars to be obtained and require modification of the securing supports in the cabinets.

SUMMARY OF THE INVENTION

The object of the invention is therefore to propose an improved solution for current conduction that does not present all or part of the drawbacks of the state of the art. More precisely, the object of the invention is to propose an optimized solution for current conduction enabling quick assembly and electric connection, that is suitable for high-amperage currents and/or three-phase currents. The use of this type of profile enables losses by Joule effect to be reduced for an equivalent cross-section.

For this purpose, the invention relates to a longitudinal electric conductor the cross-section of which is inscribed in a rectangle, said conductor having an envelope of right angled parallelepipedal shape. The conductor is preferably made from aluminium, in particular anodized aluminium, and forms a single part. The conductor comprises recesses internal to its envelope which extend over the length of the conductor, the envelope of which enables a curved surface extending over the length of conductor to be defined. The intersection, orthogonally to the length, with the whole cross-section of the conductor forms a curved line which joins two adjacent corners of the rectangle forming the envelope of said cross-section. The conductor thus comprises a first main part and a complementary second part which includes the recesses and represents less than 40% of the conducting material of the current conductor, such that the envelope of the cross-section of the first part is formed by three sides of the rectangle and the curved line and the envelope of the cross-section of the second part is formed by the fourth side of the rectangle, preferably a large side, and said line. The recesses are therefore not arranged in symmetrical manner within the conductor.

To strengthen the conductor mechanically, it is preferred for the second part to be closed between the two adjacent corners by a substantially rectilinear strip which can be connected from its central area to the main part of the conductor by braces. The outer surface of the conductor formed by the strip can comprise fins for cooling the latter and a flat surface acting as bearing surface for mechanical milling of the opposite surface of the conductor.

Advantageously, the surface separating the first and second part is concave. It is further preferred for the conductor to be continuous, i.e. for the cross-section of the conductor to be constant, with the curved lines of superposable intersection whatever the cross-section of the conductor involved.

Preferably, whatever the cross-section involved, the two opposite surfaces which each comprise one of the adjacent corners of the generally rectangular shape are provided with teeth designed for securing in an insulating support of an electric cabinet. To enhance its cooling, the conductor can comprise fins on its outer surface.

The electric conductor according to the invention comprises contact tracks around a connecting groove, in its main part. When the conductor is made from aluminium, the contact tracks can be covered with copper, in which case it is preferred for the conductor to comprise grooves arranged around the contact tracks to enable positioning of masks when a copper deposition operation is performed on the contact tracks.

The invention also relates to a set of conductors comprising at least several conductors of different cross-section which all present an identical connecting groove.

According to another feature, the invention relates to an arrangement of at least two conductors mechanically and electrically connected by at least one connecting device which comprises apertures designed to collaborate with the groove of the conductors for securing means of screw or bolt type. The connecting device comprising said securing means can comprise positioning pins.

Finally the invention relates to an electric cabinet comprising a plurality of conductors advantageously arranged in parallel and in offset stepped manner, and an insulating support supporting at least one of said conductors.

BRIEF DESCRIPTION OF THE DRAWINGS

These objects, features and advantages of the present invention will be set out in detail in the following description of a particular embodiment given for non-restrictive purposes only in relation with the appended figures in which.

DETAILED DESCRIPTION OF A PREFERRED EMBODIMENT

Figure 1:
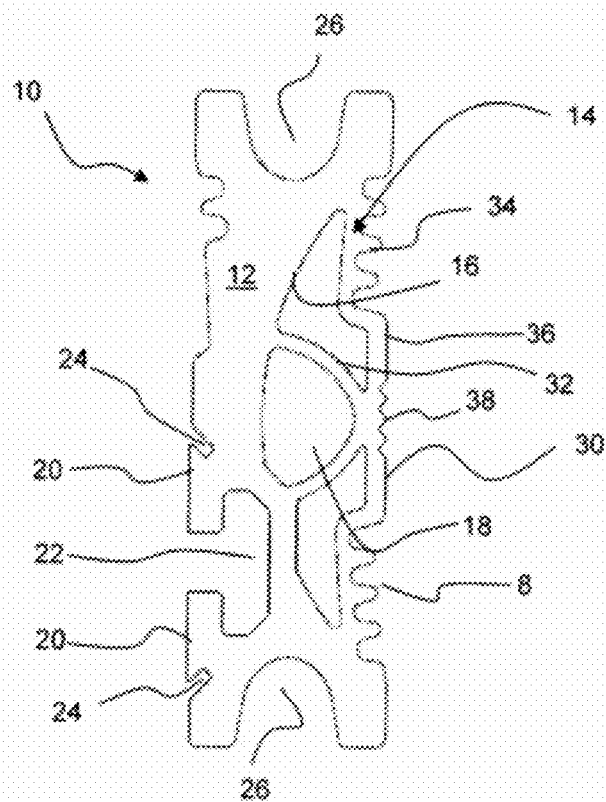
FIG. 1 represents the cross-section of a current conductor according to an embodiment of the invention.

In the different figures, the same reference numerals are used for similar parts for the sake of simplicity and clarity.

Commercialized busbar supports, and even electric cabinets, are not suitable for direct replacement of existing copper busbars by bars for example made from aluminium, which would require greatly increased conductor cross-sections. The conductor profile according to the invention, illustrated in particular in FIG. 1, enables this requirement to be met.

Figure 4A:
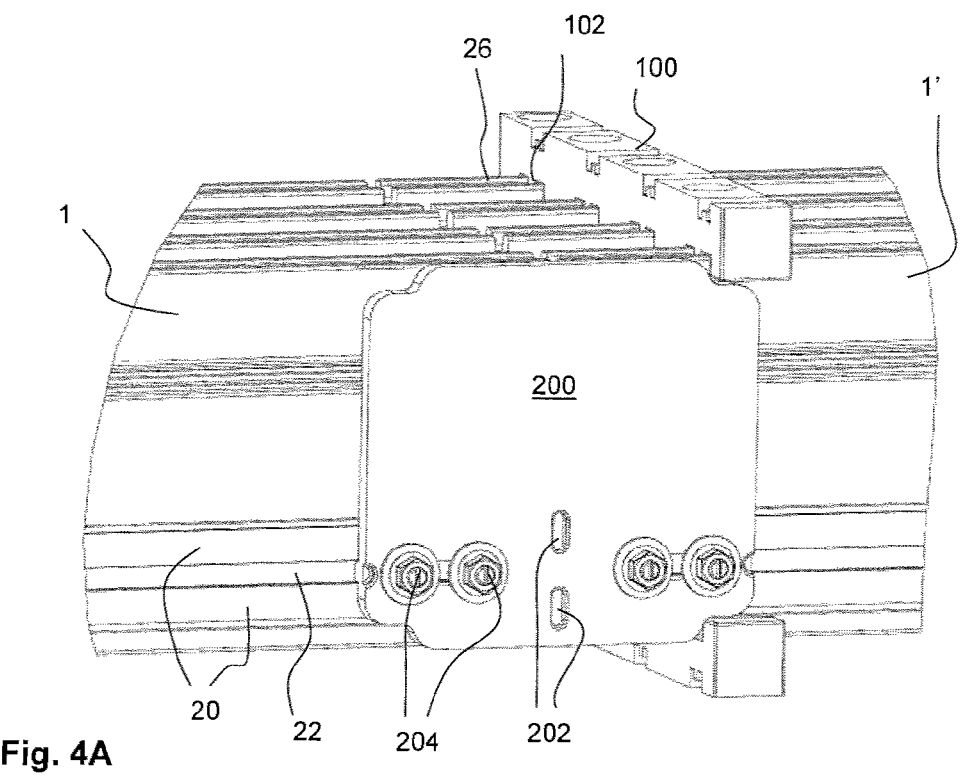
FIG. 4A represents the connection between two aligned current conductors according to an embodiment of the invention.
Figure 5A:
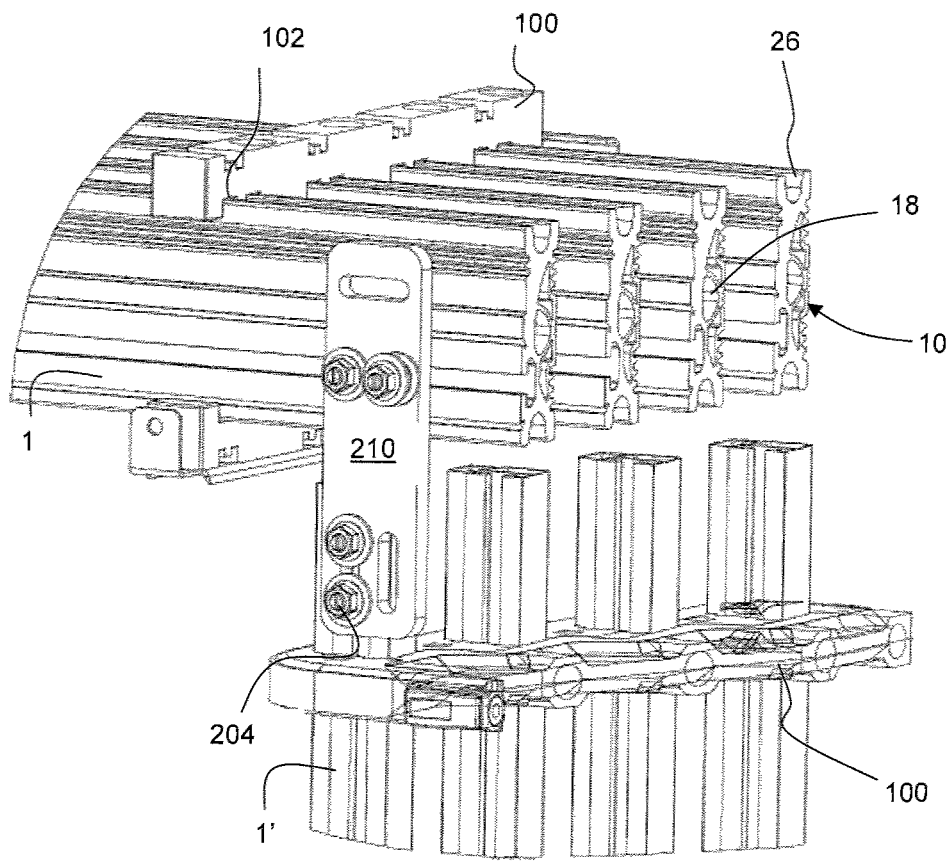
FIG. 5A represents the connection between two perpendicular current conductors according to an embodiment of the invention.

The current conductor 1 according to the invention is in the form of a bar, the generally parallelepipedal shape or envelope of which extends over an input length that is much greater than its cross-section (see FIGS. 4A, 5A). Orthogonally to its length, the current conductor 1 presents a generally rectangular cross-section 10 in which a main part 12 performing the main function of current conduction, complementary to an adjacent second part 14, can be identified (see FIG. 2B). This conducting first main part 12 presents an orthogonal cross-section delineated by three of the sides of the enveloping rectangle of the cross-section 10 of conductor 1 and by a curved line 16. The curved line 16, or more generally the curved surface generated by this line 16 over the length of conductor 1, is defined by a set of longitudinal bores or recesses 18 passing through the envelope of conductor 1 over the length of the latter. Advantageously, the two edges of the parallelepiped cutting the separating surface between the first and second part 12, 14 define a large face of said parallelepiped.

The conductor 1 according to the invention thus comprises a concave surface which truncates the rectangle in which the real cross-section 10 of conductor 1 is inscribed. It extends between two adjacent corners of this generally rectangular cross-section 10, and forms an inward curve so as to present a minimum thickness in its centre, about one third of the width of the generally rectangular cross-section 10. The separating surface preferably presents a substantially regular and symmetrical shape between its two ends, the curved line 16 forming an arc of a circle or a portion of an ellipse. Advantageously, whatever its position along the conductor 1, the cross-section 10 is identical and superposable.

Figure 2A:
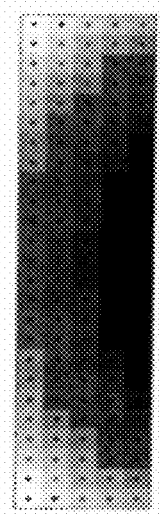
FIG. 2A represents the current distribution within the cross-section of a current conductor of generally rectangular cross-section.
Figure 2B:
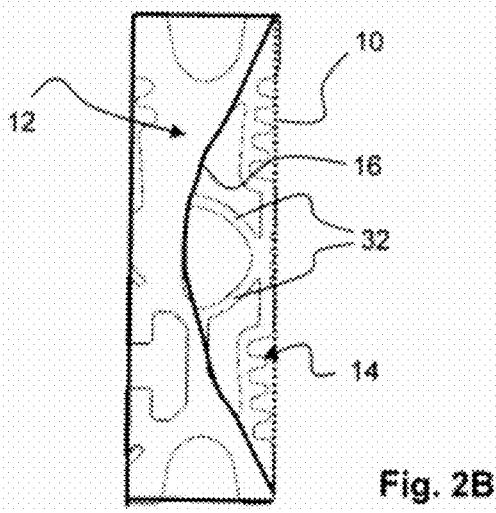
FIG. 2B represents the cross-section of the current conductor according to the embodiment of the invention in which the main part is highlighted.

The inventors de facto ascertained that the current flowing in a conductor 1 of rectangular shape does not use the whole of the cross-section 10. Two phenomena account for this: the skin effect which is expressed by a higher current at the periphery of the cross-section 10 and the proximity interaction due to the three-dimensional effects of the three-phase current flowing between three (or four) adjacent bars 1 which is expressed by polarization of the current on one side of conductor 1. FIG. 2A illustrates the result of these phenomena by showing the current distribution in the cross-section of a rectangular conductor, this current density being greater the lighter the colour. It is apparent that the current is mainly located on the left part of this rectangular cross-section. The invention uses this feature for a design of the bar 1 in which the distribution of shape and density of conducting material is similar to the current distribution—see FIG. 2B.

The cross-section 10 of conductor 1 further comprises at least two contact tracks 20 (or even four, depending on the rating), which act as contact surface around a connecting groove 22 arranged on the flat surface of the main part 12 of conductor 1, opposite its curved surface 16. This connecting groove 22 presents a T-shaped cross-section which acts as housing for a screw or other securing means when electric connection is performed, as will be described in detail in the following. Two small grooves 24 inclined at about 45° and with a width of 2 mm are arranged on each side of the contact tracks 20. They serve the purpose of enabling insertion of masks in the form of mechanical metal plates which are used to protect the rest of the section when and if a copper deposition operation is performed on the contact tracks 20, while at the same time acting as chicanes stopping the copper particles.

The cross-section 10 of conductor 1 further comprises indented teeth 26 with a width comprised between 5 and 10 mm, located on the two opposite parallel surfaces of the first part 12, corresponding to the width of the cross-section 10 and each comprising adjacent corners. These teeth 26 have the function of facilitating fixing and securing of conductor 1 in an electric cabinet. They are designed to collaborate with corresponding serrations of an insulating support 100 designed to receive the conductor 1. The shape and size of the teeth 26 preferably correspond to the dimensions of the insulating supports 100 traditionally used in the electric cabinet to be able to fit the electric conductors 1 according to the invention instead of and in place of the existing copper conductors.

The second part 14 of the cross-section of conductor 1 can preferably, and in particular for high ratings, comprise a substantially rectilinear thin strip 30 which closes the rectangle in which the cross-section 10 of conductor 1 is inscribed. It thus represents an opposite surface to the surface of the main part 12 bearing the groove 22. The central part of the strip 30 is connected to the curved line 16 of this main part 12 by braces 32 in the form of curved thin strips of small thickness. Between these elements 30, 32, the cross-section of the second part 14 of conductor 1 is mainly open, indented, so as to comprise little material. It therefore corresponds to the recesses 18 passing longitudinally through the conductor 1. This type of closed hollow profile proposes an optimum moment of inertia for these stresses. The elements containing the second part 14 also provide the necessary strength to withstand mechanical stresses on a short-circuit.

The outer surface formed by the thin strip 30 of conductor 1 comprises fins 34 performing the function of increasing the heat exchange surface of conductor 1 and of improving cooling of the latter. Alternatively (FIG. 3A), the fins can be located directly on the curved line 16. Fins can also be fitted on the surface opposite the strip 30, on the first part 12. Advantageously, a flat outer surface 36, in a central area of the narrow strip 30 of conductor 1, acts as support surface for placing and bracing of conductor 1 when mechanical operations such as milling or machining of the opposite flat surface of the main part 12 are performed, examples of which will be described further on. The braces 32 perform a complementary function of providing mechanical strength of the whole of the conductor when these mechanical operations are performed.

Finally the cross-section 10 of the conductor comprises small grooves 38 for the purposes of visual identification. It is in fact advantageous, whatever the rating of conductor 1, for the outer surface of the conductors to be identical for a given height (the size of the recesses 18 then being different). The grooves 38 then enable the rating of conductor 1 to be easily recognized without any other differentiating means. For this, each type of conductor comprises a different number of grooves. As a complement, conductor 1 can comprise a marking repeated several times over the length of conductor 1 with a pitch so as chosen to remain visible even on the smallest length of the cut conductor 1, in particular on the surface of the first part. This marking enables the current rating of the section to be indicated and/or any other useful indication to be given.

According to the embodiment of the invention, the cross-section 10 of conductor 1 can be included in a rectangle with a height comprised between 60 mm and 200 mm and a width of 20 to 30 mm to enable conduction of a current of 630 to 4000 A. Such a conductor 1, due to the profile defined according to the invention, has sufficiently good performances to be totally or partially made from aluminium, which presents the advantage of a light weight favourable for handling and for ergonomy of assembly, and of a low cost. As a variant, the conductor can comprise a part of copper, or be entirely made from copper.

In the case where aluminium is chosen, surface treatment by anodizing, for example with a thickness of 15 µm, is advantageously performed in order to obtain a layer protecting against corrosion and to enhance the thermal emissivity. Furthermore, the contact tracks 20 are covered by a layer of copper of small thickness, for example comprised between 40 and 120 µm, deposited by thermal projection after anodizing of the latter has been eliminated by milling, if anodizing was performed. It is for performing these operations that the small grooves 24 and flat surface plane 36 are used, as mentioned in the foregoing.

The invention is naturally not limited to the form represented and the conductor can present other cross-sections than those described in the foregoing, with however a main conducting part 12 connecting the major part, from 50 to 80%, of the conducting material of the section 10 of conductor 1, and presenting at least one curved, advantageously concave, surface. In particular, the shape and size of the recesses 18, the number and presence of the fins 34, braces 32 etc. can vary—see FIG. 3.

Figure 3A:
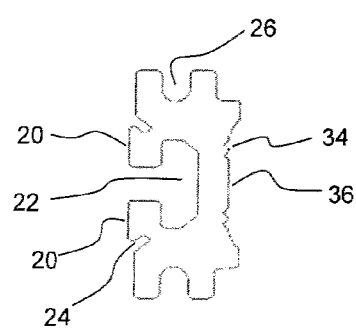
FIGS. 3A and 3B show the cross-section of current conductors of a set of conductors according to an embodiment of the invention, respectively for low amperage and very high amperage.
Figure 3B:
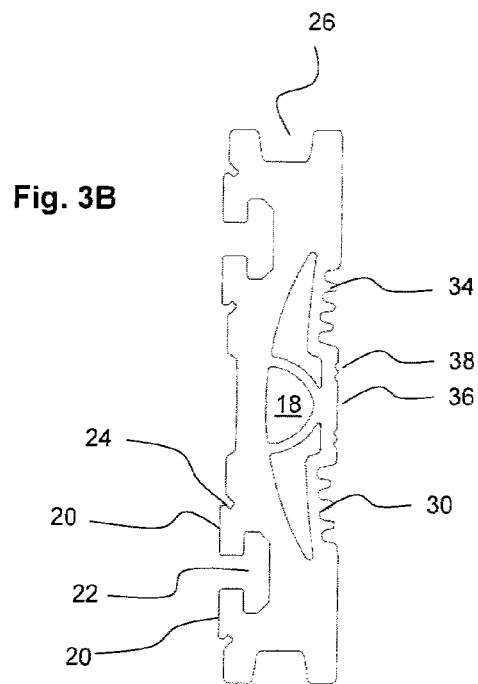
Figure 6A:
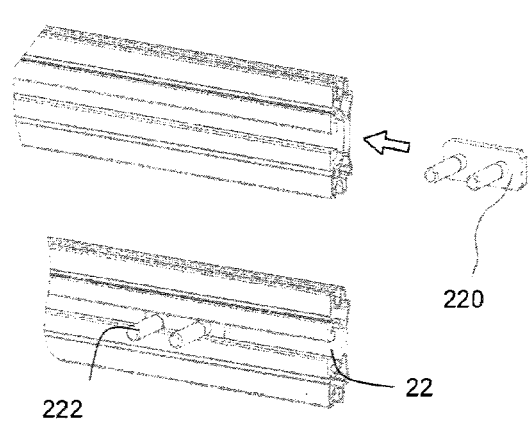
FIGS. 6A and 6B illustrate an alternative method for securing the connecting devices.
Figure 6B:
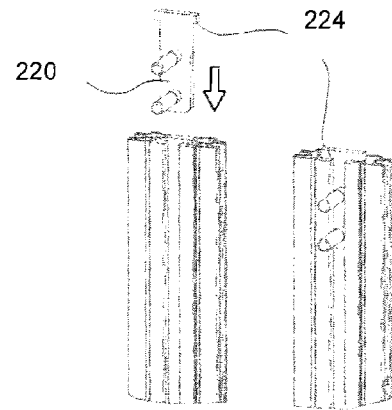

The invention also relates to a set of conductors in order to cover current distributions over a wide current range, from 630 to 4000 A. For the extreme values of these currents, the set of conductors can comprise elements which do not have the shape described in relation with the embodiment of the invention, said embodiment being used under certain dimensions covering a part of the range. The set of conductors can thus comprise a conductor of simplified cross-section, as represented in FIG. 3A, for the weakest currents, and a conductor of large size and large cross-section, as represented in FIG. 3B, for the strongest currents. However, all the conductors 1 of the set comprise a connecting groove 22 and contact tracks 20 of the same dimensions to perform standardized connection. Furthermore, according to an advantageous embodiment, they all comprise the small grooves 24, the fins 34 on the opposite surface, and the connecting teeth 26 for assembly in an electric cabinet.

The conductor described in the foregoing is thus suitable for use in an electric cabinet for current distribution, such as that described in the document EP 0681355 presented in the foregoing. Such a cabinet can thus comprise several conductors in the form of an elongate bar, positioned in a horizontal or vertical direction. It should be noted that in the horizontal direction, the conductor can be used in two different directions consisting in positioning the connecting groove 22 facing upwards or downwards.

In their positioning in an electric cabinet, the teeth 26 of conductor 1 collaborate with insulating serrations 102 of a suitable insulating support 100 designed to accommodate different formats of conductors 1 by means of possible addition of shims. This cabinet then comprises several conductors 1 arranged in parallel, in the horizontal or vertical direction, in advantageously offset manner to form a stepped structure. Advantageously, the conductor 1 according to the embodiment of the invention remains compatible with fitting in a standard cabinet that is also able to accommodate flat standard copper bars with a width of 5 or 10 mm.

Figure 4B:
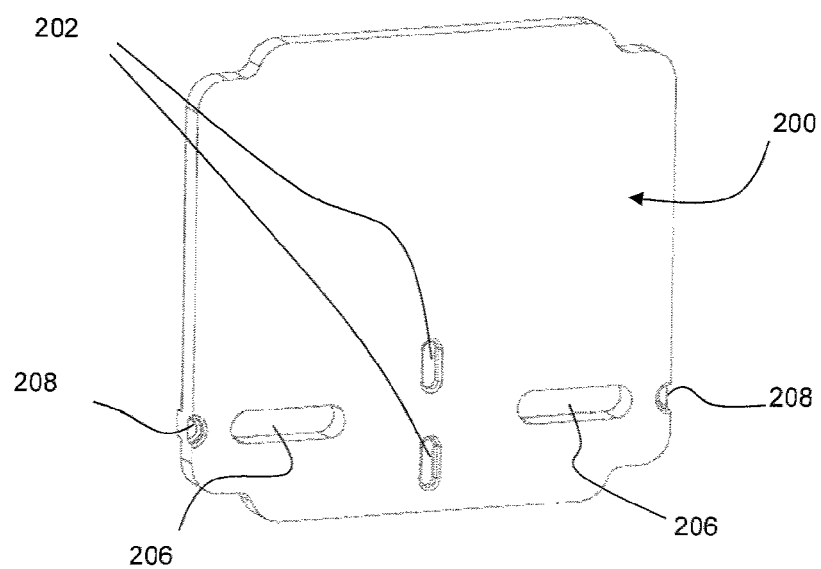
FIG. 4B shows the fish-plate for this connection.

Furthermore, the conductor according to the embodiment can easily be connected to another conductor. FIGS. 4A and 4B illustrate for this purpose connection of two aligned conductors 1, 1' by means of a mechanical and electrical connecting device 200, here a fish-plate dimensioned to comply with the dielectric, mechanical and thermal stresses imposed on the conductors 1 in an electric cabinet.

Two aligned horizontal conductors 1, 1', as described in the foregoing, are connected to one another end to end by fish-plates 200 which present a suitable dimension for a given conductor 1. For a set of conductors, a set of corresponding fish-plates will also be provided. To enhance precise positioning of a fish-plate 200 and to obtain an optimal electric contact, each fish-plate 200 comprises positioning pins 202, in the central part thereof, enabling an equivalent distribution of the contact surfaces of the fish-plate 200 with each conductor 1, 1', more precisely with their contact tracks 20. Furthermore, fixing of a fish-plate 200 onto each conductor 1, 1' is obtained by two times two screws 204 the heads of which are positioned in captive manner within the groove 22 of a conductor 1 and enable movement thereof in translation until the correct final positioning is achieved. Each screw or bolt 204 passes through an aperture 206 of the fish-plate 200 so that a nut can collaborate with the threaded part of the shank protruding outwards to perform fixing of the fish-plate 200 onto the conductor 1. These screws 204 perform mechanical fixing and at the same time provide an electric connection between a conductor 1 and a fish-plate 200. Each fish-plate 200 further comprises positioning pins 208 on the ends thereof, which pins provide assistance in assembly by facilitating superposed positioning of the aperture 206 and of the connecting groove 22.

Figure 5B:
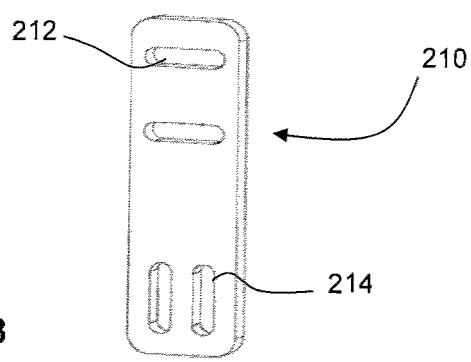
FIG. 5B shows the appropriate means.

In similar manner, FIGS. 5A and 5B represent a connection of two conductors 1, 1' arranged in a perpendicular direction. This connection is achieved by means of another connecting device 210 comprising on the one hand at least one horizontal aperture 212 for fixing the horizontal conductor 1 and on the other hand at least one vertical aperture 214 for fixing the vertical conductor 1'. Each conductor 1, 1' is connected to the connecting device 210 by two screws 204 as explained in the foregoing.

It can be noted that the connecting device 210 represented in FIG. 5B comprises two horizontal apertures 212 as the connecting groove 22 of conductor 1 could be located at the top or at the bottom. In the example represented, it is located at the bottom, and the bottom horizontal aperture 212 is used for connection. Likewise, it comprises two vertical apertures 214 to adapt to the two possible orientations of the vertical conductor 1'.

It can be noted that FIGS. 4A and 5A illustrate a part of an electric cabinet showing several parallel conductors 1 connected with several conductors 1' by fish-plates 200, 210 as described in the foregoing, only one of which is visible in the figures. The top and bottom surfaces of all these conductors 1, 1' are further secured by insulating supports 100 comprising teeth 102 of corresponding shape to the teeth 26 of the conductors, as mentioned in the foregoing.

The two connecting devices 200, 210 as set out in the foregoing are preferably made from copper and present a sufficient contact surface with the conductors 1, 1' to ensure flow of the current.

In an alternative, and in particular for the highest current ratings of 1600, 2500, 3200 and 4000 A type, the connections between the bars 1 (vertical or horizontal) and connecting devices 200, 210 (copper parts) are made by means of a small steel plate 220 on which two bolts 222 of suitable length are fixed. These plates 220 are slid into the grooves 22 of the sections 1. In the horizontal conductors, the plate 220 can slide over the whole length of the section, but for the vertical conductors it is advantageous for the plate 220 to slide to the end of the section and to be wedged by means of stops 224 so as to remain at the top of the vertical section where connection of the link is made.

The bolts 222 extend beyond the section 1 and pass through the connecting parts 200, 210. Securing is performed by means of a nut screwed onto the bolt 222. The plate 220, acting as screw head, thereby provides a better grip in the groove 22. Its contact surface is much larger than the head of a screw of "hammer-head" type, with a very great strength when electrodynamic stresses occur, and the electromechanical performance of the connection is thereby enhanced. Furthermore, the fitter's job is made easier by the fact that the bolts 222 protrude out from the groove 22 on the front surface and act as gripping part assisting adjustment of the position of the plate 220 before fitting.

The design of conductor 1 according to the invention thereby provides an optimized current conduction solution, enabling fast erection and electric connection, suitable for high-amperage and/or three-phase currents. The use of this type of profile enables losses by Joule effect to be reduced, for an equivalent cross-section. This feature enables aluminium to be used for example instead of copper while preserving a similar cross-section of envelope. This invention enables a distribution system to be designed from these conductors. The system then comprises horizontal and vertical conductors and connection parts. The claimed performance is due to the combination of these different elements thus forming the system.

The invention claimed is:

1. A longitudinal, generally parallelepiped electrical conductor bar, comprising:
   a length having a cross-section in a direction normal to the length, said cross-section comprising:
   a generally rectangular area having two sides and two ends,
   a substantially continuously curved portion in an arc-like shape extending from one corner of said area to an adjacent corner of said area,
   said arc-like shape defining two complementary but integral sections of the area, namely,
   a first section whose perimeter comprises the arc-like shape, said two ends and one of said two sides of said area, and
   a second section whose perimeter comprises the arc-like shape and the other side of said two sides of said area,
   with a plurality of parallel, elongate bores extending through the length of said conductor bar, said bores piercing the area with the perimeter of said second section.

2. The electrical conductor bar according to claim 1, wherein the arc-like shape includes a concave surface separating the first and second sections.

3. The electrical conductor bar according to claim 1, wherein the first section of the conductor comprises at least 60 percent of the material of the conductor bar.

4. The electrical conductor bar according to claim 3, wherein the second section comprises a substantially linear strip comprising the side between the two adjacent corners, and connected by braces from its central area to the arc-shape.

5. The electrical conductor bar according to claim 4, wherein said one side of the perimeter of said first section comprises contact tracks defining a connecting groove.

6. The electrical conductor bar according to claim 5, additionally comprising fins on the linear strip for cooling, said strip additionally comprising a bearing surface for mechanical milling of the conductor.

7. A set comprising a plurality of electrical conductor bars according to claim 6, wherein the conductor bars are mechanically and electrically connected by at least one connecting device having apertures for securing means passing through said apertures and a connecting groove of one of the conductor bars.

8. An electric cabinet comprising therein a plurality of electrical conductor bars according to claim 7, and an insulating support supporting at least one of said conductor bars.

9. The electrical conductor bar according to claim 1, wherein the first and second sections are aluminium.

10. The electrical conductor bar according to claim 1, wherein, the two ends each comprise teeth for securing in an insulating support of an electric cabinet.

11. The electrical conductor bar according to claim 1, additionally comprising fins on its outer surface of the conductor bar to facilitate cooling.

12. The electrical conductor bar according to claim 1, wherein the second section comprises a substantially linear strip comprising the side between the two adjacent corners and connected by braces from its central area to the arc-like shape.

13. The electrical conductor bar according to claim 12, wherein the strip comprises fins for cooling, and a flat bearing surface for mechanical milling.

14. The electrical conductor bar according to claim 1, wherein said one side of the perimeter of said first section comprises contact tracks defining a connecting groove.

15. The electrical conductor bar according to claim 14, wherein the conductor comprises aluminium, and the contact tracks are covered with copper.

16. A set comprising a plurality of the electrical conductor bars according to claim 14, each of the conductor bars of the set comprising an identical connecting groove, and at least one conductor bar among said set having a partially different cross-section from at least one other conductor bar in said set.

17. A set comprising a plurality of the electrical conductor bars according to claim 14, wherein the conductor bars are mechanically and electrically connected by at least one connecting device having apertures for securing means passing through said apertures and a connecting groove of one of the conductor bars.

18. The set of conductor bars according to claim 17, wherein the connecting device comprises positioning pins.

19. An electric cabinet comprising therein a plurality of electrical conductor bars according to claim 1, and an insulating support supporting at least one of said conductor bars.

20. The electric cabinet according to claim 19, wherein the electrical conductor bars are arranged in a parallel, offset, stepped structure.

* * * * *